United States Patent [19]

Spaulding

[11] 4,066,583

[45] Jan. 3, 1978

[54] FLEXIBLE WATER ABSORBENT POLYMER COMPOSITIONS COMPRISING (A) UNSATURATED CARBOXYLIC ACID, ACRYLIC ESTER CONTAINING ALKYL GROUP 10-30 CARBON ATOMS, ADDITIONAL MONOMER PLUS (B) ALIPHATIC DIOL

[75] Inventor: David Chantrill Spaulding, Cuyahoga Falls, Ohio

[73] Assignee: The B. F. Goodrich Company, Akron, Ohio

[21] Appl. No.: 796,914

[22] Filed: May 16, 1977

[51] Int. Cl.$^2$ .................... C08L 5/00; C08F 218/02; C08F 218/14

[52] U.S. Cl. .................. 260/17.4 SG; 260/33.4 R; 526/15; 526/16; 526/47; 526/49; 526/206; 526/271; 526/317

[58] Field of Search .................. 260/17.4 SG, 33.4 R; 526/271, 317, 15, 16, 49, 47, 206

Primary Examiner—Herbert J. Lilling
Attorney, Agent, or Firm—J. Hughes Powell, Jr.

[57] ABSTRACT

Flexible films, fibers, and the like, of (1) potassium, ammonium and amine salts of unsaturated copolymerizable carboxylic acids, at least one alkyl acrylate or methacrylate ester wherein the alkyl group contains 10 to 30 carbon atoms and at least one of an alkyl acrylate or methacrylate wherein the alkyl group contains 1 to 9 carbon atoms, an acrylic or methacrylic nitrile or amide optionally with a small amount of a cross-linking agent and (2) an aliphatic glycol, rapidly absorb and retain large quantities of water and ionic fluids are useful in disposable nonwoven articles.

20 Claims, No Drawings

FLEXIBLE WATER ABSORBENT POLYMER COMPOSITIONS COMPRISING (A) UNSATURATED CARBOXYLIC ACID, ACRYLIC ESTER CONTAINING ALKYL GROUP 10-30 CARBON ATOMS, ADDITIONAL MONOMER PLUS (B) ALIPHATIC DIOL

BACKGROUND OF THE INVENTION

U.S. Pat. No. 3,915,921 discloses copolymers of unsaturated carboxylic acid monomers with an alkyl acrylate ester wherein the alkyl group contains about 10 to 30 carbon atoms that are efficient water thickeners.

Improved copolymers of about 40 to 87 weight percent of unsaturated copolymerizable carboxylic acid monomers, about 3 to about 20 weight percent of at least one alkyl acrylate ester wherein the alkyl group contains 10 to 30 carbon atoms and about 5 to 30 weight percent of at least one alkyl acrylate ester wherein the alkyl group contains 1 to 9 carbon atoms, optionally with a small amount of a comonomer cross-linking agent, rapidly absorb and retain large quantities of water and also absorb and retain ionic aqueous fluids. For use in many disposable nonwoven articles where such absorbents are useful these materials are preferably in film or fiber form. Because of the high Tg of these polymeric materials, it is difficult to extrude them in fiber or film form. Further, films pressed from the powders require high temperatures, the films are brittle and fragile, and have a reduced initial rate of water absorption.

Polymeric coatings for treating filamentary materials of a hydrophobic nature so as to give them a durable, antistatic, antisoilable finish are disclosed in U.S. Pat. No. 3,236,685; by a process including first coating the article with a polymeric polybasic acid and the coating dried, and then applying an epoxide or polyol to provide a hydrophilic insoluble coating having antistatic and antisoiling properties after heating to obtain cross-linking. The polyepoxides contain two or more epoxy groups and should have an epoxy equivalent weight below 1000. Epoxidized triglycerides and the epoxy polyethers of polyhydric phenols are typical. Typical polyols include pentaerythritol, trimethylol propane, sorbitol, glycerine, poly(oxyalkylene) glycols and the like. U.S. Pat. No. 2,838,421 discloses an adhesive which is a blend of a polyvinyl carboxylic acid and a compatible hydroxy polyalkylene compound as polyethylene glycol of molecular weight from 400 to 1,000, used in amounts of 140 to 160 weight parts per 100 weight parts of polyacrylic acid or 2-ethyl-1,3-hexanediol in amounts of 200 parts per 100 parts of polyacrylic acids. These compositions preferably include a cross-linking compound which is a polyfunctional epoxy compound reaction product of bisphenol A and epichlorohydrin. Textile sizes comprising a partially neutralized polyacrylic acid are disclosed in U.S. Pat. No. 2,702,796. These compositions require polymethacrylic acid, a plasticizer and a lubricating compound. The neutralization cannot be complete and preferably is carried out above a pH of 6 with, for example, sodium hydroxide, trisodium phosphate, morpholine, and the like. The plasticizers include ethylene glycol, glycerol, or sorbitol which is preferred because of its superior properties. The fourth required component is an emulsifiable lubricant, a polyoxyethylene condensate of a lyophilic aliphatic organic compound containing at least three oxyethylene groups as a hydrophilic portion and one or more hydrocarbon radicals forming the lipophilic portion and containing 12 to 18 carbon atoms. The patent teaches that for best results, a high melting wax is required such as bees wax, carnauba wax, and the like.

SUMMARY OF THE INVENTION

Potassium, ammonium and amine salts of copolymers of about 40 to 87 weight percent of unsaturated copolymerizable carboxylic acid monomers, about 3 to about 20 weight percent of at least one alkyl acrylate or methacrylate ester wherein the alkyl group contains 10 to 30 carbon atoms and about 5 to 30 weight percent of at least one of an acrylic or methacrylic nitrile, amide or ester, said ester group containing 1 to 9 carbon atoms, optionally with a small amount of a cross-linking agent and containing an aliphatic glycol containing 4 to 8 carbon atoms, provide flexible film strips, fibers and the like of said compositions which have a rapid and high ultimate absorption and retention of water and ionic solutions.

DETAILED DESCRIPTION

In accordance with this invention, the glycols can be readily mixed with the polymers in powder form to form dry powder mixtures that can be hot pressed or extruded in film or fiber form. The polymers normally have more than 30 weight percent of the carboxyl groups neutralized with ammonia, potassium, or amine compound to form $-CO_2M$ groups. Mixtures containing as high as about 150 weight parts of glycol compound per 100 weight parts of polymers are stable free-flowing dry powders that can be pressed at temperatures of about 50° to about 200° C., more preferably 100°–150° C., to form clear flexible films that have high absorption of water and ionic aqueous solutions.

The copolymers of carboxylic acid monomer and the acrylic esters, amides or nitriles of the types and in the amounts defined hereinafter provide a faster rate of absorption of water and aqueous ionic fluids in flexible form than copolymers not containing these essential comonomers in the amounts set forth, or other salts than those defined. The copolymers also demonstrate improved retention of absorbed fluid as compared to prior art polymers. The copolymers are readily prepared by copolymerizing the essential monomers, and optionally other comonomers as defined, by free radical polymerization systems. These copolymers have weight average molecular weights from about 10,000 to greater than 1,000,000. Normally, the molecular weights are from about 50,000 to 900,000. Molecular weights of cross-linked polymers may be higher.

The carboxylic monomers useful in the production of the polymers of this invention are the olefinicallyunsaturated carboxylic acids containing at least one activated carbon-to-carbon olefinic double bond, and at least one carboxyl group, that is, an acid containing an olefinic double bond which readily functions in polymerization because of its presence in the monomer molecule either in the alpha-beta position with respect to a carboxyl group thusly,

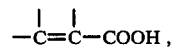

or as a part of a terminal methylene grouping thusly, $CH_2=C<$ present in the copolymer in amounts from about 40 to 87 weight percent of the copolymer. In the alpha-beta acids the close proximity of the strongly polar carboxyl group to the double-bonded carbon atoms has a strong activating influence rendering the substances containing this structure very readily polymerizable. The presence of a terminal methylene grouping in a carboxylic monomer makes this type of compound much more easily polymerizable than if the double bond were intermediate in the carbon structure. Olefinically-unsaturated acids of this class include such widely divergent materials as the acrylic acids typified by acrylic acid itself, methacrylic acid, ethacrylic acid, alpha-chloroacrylic acid, alpha-cyano acrylic acid, beta methyl-acrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), itaconic acid, citraconic acid, mesaconic acid, glutaconic acid, aconitic acid, maleic acid, fumaric acid, and tricarboxy ethylene. As used herein, the term "carboxylic acid" includes the polycarboxylic acids and those acid anhydrides, such as maleic anhydride, wherein the anhydride group is formed by the elimination of one molecule of water from two carboxyl groups located on the same polycarboxylic acid molecule. Maleic anhydride and the other acid anhydrides useful herein have the general structure

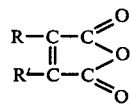

wherein R and R' are selected from the group consisting of hydrogen, halogen and cyanogen (—C≡N) groups and alkyl, aryl, alkaryl, aralkyl, and cycloalkyl groups such as methyl, ethyl, propyl, octyl, decyl, phenyl, tolyl, xylyl, benzyl, cyclohexyl and the like.

The preferred carboxylic monomers for use in this invention used in amounts of 40 to 87 weight percent total of the monomers polymerized are the monoolefinic acrylic acids having the general structure

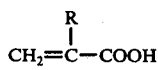

wherein R is a substituent selected from the class consisting of hydrogen, halogen, and the cyanogen (—C≡N) groups, monovalent alkyl radicals, monovalent aryl radicals, monovalent aralkyl radicals, monovalent alkaryl radicals and monovalent cycloaliphatic radicals. Of this class, acrylic and methacrylic acid are most preferred because of generally lower cost, ready availability, and ability to form superior polymers. Another useful carboxylic monomer is maleic anhydride or the acid.

The preferred acrylic ester monomers having long chain aliphatic groups are derivatives of an acrylic acid represented by the formula

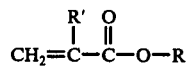

wherein R is an alkyl group having from 10 to 30 carbon atoms, preferably 10 to 20 carbon atoms and R' is hydrogen or a methyl or ethyl group present in the copolymer in amount from about 2 to 20 weight percent, more preferably, about 5 to 15 weight percent. Representative higher alkyl acrylic esters are decyl acrylate, isodecyl acrylate, lauryl acrylate, stearyl acrylate, behenyl acrylate and melissyl acrylate and the corresponding alkacrylates including methacrylates for example. Mixtures of two or three or more long chain acrylic esters may be successfully polymerized with one of the carboxylic monomers to provide useful thickening resins of this invention. Particularly useful are those methacrylates where the alkyl group contains 16 to 21 carbon atoms present in amounts of about 5 to 15 weight percent of the total monomers. Outstanding polymers have been made with 15±5 weight percent isodecyl methacrylate, 10±3 weight percent lauryl methacrylate, 7±3 weight percent stearyl methacrylate.

The other acrylic esters are also derivatives of an acrylic acid used in amounts of about 5 to 30 weight percent represented by the formula

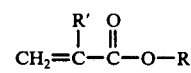

wherein R is an alkyl, alkoxy, haloalkyl, cyanoalkyl, and like groups having from 1 to 8 carbon atoms and R' is hydrogen or a methyl or ethyl group. These acrylic esters are present in the copolymer in amount from about 5 to 30 weight percent and more preferably from about 5 to 25 weight percent. Representative acrylates include methyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl acrylate, nonyl acrylate, hexyl acrylate, n-hexyl methacrylate, and the like.

The acrylic nitriles, α, β-olefinically unsaturated nitriles useful in the interpolymers embodied herein are preferably the monoolefinically unsaturated nitriles having from 3 to 10 carbon atoms such as acrylonitrile, methacrylonitrile, ethacrylonitrile, chloroacrylonitrile, and the like. Most preferred are acrylonitrile and methacrylonitrile. The amounts used are from about 5 to 30 weight percent of the total monomers copolymerized.

The acrylic amides include monoolefinically unsaturated amides which may be incorporated in the interpolymers of this invention having at least one hydrogen on the amide nitrogen and the olefinic unsaturation is alphabeta to the carbonyl group. The preferred amides have the structure

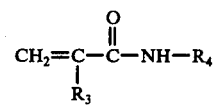

wherein $R_3$ is a member of the group consisting of hydrogen and an alkyl group having from 1 to 4 carbon atoms and $R_4$ is a member of the group consisting of hydrogen and an alkyl group having from 1 to 6 carbon atoms. Representative amides include acrylamide, methacrylamide, N-methyl acrylamide, N-t-butyl acrylamide, N-cyclohexyl acrylamide, N-ethyl acrylamide and others. Very much preferred are acrylamide and methacrylamide used in amounts from about 5 to 30 weight percent of the total monomers copolymerized.

Other acrylic amides include N-alkylol amides of alpha, beta-olefinically unsaturated carboxylic acids including those having from 4 to 10 carbon atoms such as N-methylol acrylamide, N-ethanol acrylamide, N-propanol acrylamide, N-methylol methacrylamide, N-ethanol methacrylamide, N-methylol maleimide, N-methylol maleamide, N-methylol maleamic acid, N-methylol maleamic acid esters, the N-alkylol amides of the vinyl aromatic acids such as N-methylol-p-vinyl benzamide, and the like and others. The preferred monomers of the N-alkylol amide type are the N-alkylol amides of alpha, beta-monoolefinically unsaturated monocarboxylic acids and the most preferred are N-methylol acrylamide and N-methylol methacrylamide used in amounts of about 5 to 20 weight percent.

N-alkoxymethyl acrylamides also may be used having the structure

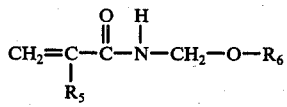

wherein $R_5$ is selected from the group consisting of hydrogen and methyl, and $R_6$ is an alkyl group having from 1 to 8 carbon atoms. It is thus intended that where references are made herein regarding the essential N-substituted alkoxymethyl amides, the term "acrylamide" includes "methacrylamide" within its meaning. The preferred alkoxymethyl acrylamides are those wherein $R_6$ is an alkyl group containing from 2 to 5 carbon atoms and useful is N-butoxymethyl acrylamide.

The preferred cross-linking monomer for use in preparing the copolymers, if one is employed, is a polyalkenyl polyether having more than one alkenyl ether grouping per molecule. The most useful possess alkenyl groups in which an olefinic double bond is present attached to a terminal methylene grouping, $CH_2=C<$. They are made by the etherification of a polyhydric alcohol containing at least 4 carbon atoms and at least 3 hydroxyl groups. Compounds of this class may be produced by reacting an alkenyl halide, such as allyl chloride or allyl bromide with a strongly alkaline aqueous solution of one or more polyhydric alcohols. The product is a complex mixture of polyethers with varying numbers of ether groups. Analysis reveals the average number of ether groupings on each molecule. Efficiency of the polyether cross-linking agent increases with the number of potentially polymerizable groups on the molecule. It is preferred to utilize polyethers containing an average of two or more alkenyl ether groupings per molecule. Other crosslinking monomers include for example, diallyl esters, dimethallyl ethers, allyl or methallyl acrylates and acrylamides, tetraallyl tin, tetravinyl silane, polyalkenyl methanes, diacrylates and dimethacrylates, divinyl compounds as divinyl benzene, polyallyl phosphate, diallyloxy compounds and phosphite esters and the like. Typical agents are allyl pentaerythritol, allyl sucrose, trimethylolpropane triacrylate, 1,6-hexanediol diacrylate, pentaerythritol triacrylate, tetramethylene dimethacrylate, tetramethylene diacrylate, ethylene diacrylate, ethylene dimethacrylate, triethylene glycol dimethacrylate, and the like. Allyl pentaerythritol and allyl sucrose provide excellent polymers in amounts less than 0.5 weight percent. Cross-linking of the polymers provides improved ability for the copolymers to swell under a confining pressure.

When the optional cross-linking agent is present, polymeric mixtures containing about 0 to about 3% by weight of cross-linking monomer based on the total of carboxylic acid monomer plus the alkyl acrylate ester monomers, and more preferably, 0.1 to 0.5 weight percent or phm.

Another method to obtain the desired cross-linking is to use a comonomer which can react to yield cross-links during polymerization. Examples are 2-hydroxyethyl methacrylate and hydroxypropyl methacrylate, and the like. These units, when copolymerized, cross-link by interchain esterification with carboxylic groups. For 2-hydroxyethyl methacrylate, about 1 to 7 weight percent of monomers based on the total weight of monomers will provide a desired degree of cross-linking.

It is preferred that the cross-linkers for the products of this invention consist essentially of those types of copolymerizable cross-linkers, thus excluding epoxy type resins and reactants as external curing agents. While the prior art teaches that polyacrylic and polymethacrylic acid polymers may be cured, cross-linked or otherwise hardened with a certain reactive resin including epoxy resins, urea formaldehyde resins, polyamines, aminoplasts, and the like, the use of these materials is not contemplated as the cross-linking agent described above for these water absorbent polymers, and it is preferred that the potassium, ammonium and amine salts of the defined interpolymers be substantially free of significant amounts of such reactive epoxy and amino type curing agents or phosphonate plasticizers for the purposes of this invention.

It will also be understood that small amounts of other vinylidene monomers, that is, those copolymerizable monomers containing at least one terminal $CH_2<$ group may also be included as a copolymerizable monomer with the essential monomers so long as such monomers do not adversely affect the desired balance of water absorption and retention of the polymeric materials. Such materials include vinyl acetate, vinyl pyrrolidone, methyl vinyl ether, ethyl vinyl ether, methyl vinyl ketone and like in amounts less than about 10 weight percent of the polymer, normally less than 5 weight percent.

The polymers of this invention are preferably made by polymerization in an inert diluent having some solubilizing action on one or more of the monomeric ingredients but substantially none on the resultant polymer. Polymerization in mass may be employed but is not preferred because of the difficulty in working up the solid polymeric masses obtained. Polymerization in an aqueous medium containing a water-soluble free radical catalyst is useful. Polymerization in an organic liquid which is a solvent for the monomers but a non-solvent for the polymer, or in a mixture of such solvents, in the presence of a solvent-soluble catalyst is most preferred because the product is usually obtained as a very fine friable and often fluffy precipitate which, after solvent removal, seldom requires grinding or other treatment before use. Suitable solvents for the latter method include benzene, xylene, tetralin, hexane, heptane, carbon tetrachloride, methyl chloride, ethyl chloride, bromo trichloro methane, dimethyl carbonate, diethyl carbonate, ethylene dichloride, and mixtures of these and other solvents.

The polymerizations desirably are conducted in the presence of a haloethane or halomethane, preferably containing at least four halogen atoms. Representative materials include for example, a fluoroethane, fluoromethane, chlorofluoromethane, bromofluoroethane, or preferably a chlorofluoroethane or chlorofluoromethane containing at least four halogen atoms including, for example, 1,1,2-trichloro-1,2,2-trichloroethane, trichlorofluoromethane, tetrafluoromethane, chlorotrifluoromethane, bromotrifluoromethane, 1-chloro-1,1,2,2,2-pentafluoroethane, dichlorodifluoromethane, 1,2-difluoro-1,1,2,2-tetrachloroethane and the like. The amounts of these materials used may be varied from the amount just sufficient to make a slurry of the reactants up to where there is a substantial excess of the chlorofluoroethane, as will be apparent to those skilled in the art. Preferred diluents are those which are solvents for the monomers but nonsolvents for the polymers.

Polymerization in the diluent medium is carried out in the presence of a free radical catalyst in a closed vessel in an inert atmosphere and under autogenous pressure or artificially-induced pressure or in an open vessel under reflux at atmospheric pressure. Temperature of the polymerization may be varied from 0° to 100° C., depending to a large degree on the molecular weight desired in the polymer. Polymerization at 50° to 90° C. under atmospheric pressure using a free radical catalyst is generally effective in bringing a polymer yield of 75% to 100% in less than 10 hours. Suitable catalysts include peroxygen compounds such as sodium, potassium and ammonium persulfates, caprylyl peroxide, benzoyl peroxide, hydrogen peroxide, pelargonyl peroxide, cumene hydroperoxides, tertiary butyl diperphthalate, tertiary butyl perbenzoate, sodium peracetate, sodium percarbonate, and the like as well as azo diisobutyryl nitrile, hereinafter referred to as azoisobutyronitrile. Other catalysts utilizable are the so-called "redox" type of catalyst and the heavy-metal activated catalyst systems.

These polymers generally do not attain their maximum properties until converted to a partial alkali, ammonium or amine salt. The neutralizing agent is preferably a monovalent alkali such as sodium, potassium, lithium or ammonium hydroxide or the carbonates and bicarbonates thereof, or mixtures of the same, and also amine bases having not more than one primary or secondary amino group. Such amines include, for example, triethanolamine, ethanolamine, isopropanolamine, triethylamine, trimethyl amine, and the like.

At least 30% of the acid, carboxyl, groups are neutralized to an ionic state, that is, $-CO_2^- M^+$. Preferably, about 50 to 90 weight percent of the acid groups are neutralized to $-CO_2M$. The counter ion $M^+$ is the alkali cation $K^+$, the ammonia ion $NH_4^+$ or quaternary cationic compounds resulting from the neutralization with an organic amine. Excellent results have been obtained with $K^+$ and $NH_4^+$.

The glycols which may be added before neutralization or after neutralization are critical. For example, sorbitol which is a preferred additive for some polyacids, is ineffective in the claimed compositions; and glycerine and other triols are also undesirable when used alone as the sole polyhydroxy compound. Excellent results have been obtained using aliphatic diols containing 2 to 10, preferably 3 to 8, carbon atoms such as propylene glycol, butylene glycol, diethylene glycol, triethylene glycol and tetraethylene glycol. Other glycols that have been used include 1,3-butanediol, 1,5-pentanediol, 1,6-hexanediol and alkyl-substituted derivatives such as 2,2-dimethyl-1,3-propanediol, 2,2-diethyl-1,3-propanediol, 2-ethyl-2-methyl-1,3-propanediol, 2-methyl-2,4-pentanediol, 2,5-methyl-2,5-hexanediol, 2-ethyl-1,3-hexanediol, and the like. Also employed are glycol ethers including diethylene glycol, triethylene glycol, tetraethylene glycol and polyethylene glycols of the formula $HO(CH_2CH_2O)_nH$ wherein $n$ is an integer, for example, greater than 5 and while it may be as great as 50 or more, better results are generally obtained when the molecular weight of the polyethylene glycol is below about 400. Other glycol ethers include dipropylene glycol, tripropylene glycol and polypropylene glycol of the formula

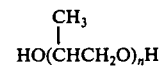

where $n$ is an integer, for example, greater than 5 and while it may be as great as 50 or more, better results are generally obtained when the molecular weight of the polypropylene glycol is below about 400, and monoalkyl ethers of these glycols, for example, ethylene glycol monomethyl ether, ethylene glycol monobutyl ether, diethylene glycol monoethyl ether, triethylene glycol monobutyl ether, tetraethylene glycol monoethyl ether, tripropylene glycol monomethyl ether, and the like. Polyhydroxy compounds containing greater than two hydroxy groups may be used in conjunction with the glycols set forth above in amounts of no greater than about 50 weight percent of the total weight mixture of glycol and polyol. Such materials include, for example, glycerol, trimethylol propane, 2-(hydroxymethyl)-2-methyl-1,3-propanediol, 1,2,6-hexanetriol, and the like. Alkanolamines including, ethanolamine, diethanolamine, triethanolamine, isopropanolamine, N,N-dimethylethanolamine, and the like. The amount of glycol additive normally used will be greater than about 30 weight parts per 100 weight parts of the defined copolymers in amounts as high as about 125 weight parts, more preferably in amounts from about 35 weight parts to 100 weight parts per 100 weight parts of copolymer added to dry polymers, solutions, dispersions, and the like.

As water absorbent materials these polymers find many uses in powder, lump, film, fiber, fabric form and like form. They are of particular utility in the disposable nonwoven industry where there is need for polymers which will absorb and retain water and ionic physiological fluids. An important feature of these polymers is their enhanced thickening property even in the presence of a salt. Specific applications include disposable diapers, medical-surgical supplies and personal care products. Such applications require a polymer which must imbibe the liquid to be absorbed rapidly and be a polymer that will not dissolve. Further, the fluid must be immobilized or congealed in some way to be retained. The materials may also be used as suitable additives to greatly increase the absorptive power of conventional absorbents such as cotton, wood pulp and other cellulosic absorbents used in applications such as wiping cloths, surgical sponges, catamenial devices, and the like. In a specific application, for example, a disposable diaper, there is an inner layer of a soft absorbent nonwoven material that absorbs and passes urine to an inner layer of fluffy fibrous absorbent material, wherein during the construction of this nonwoven fiber agglomerates or fibers of the polymers of this invention may be included and an additional impervious plastic layer, as polyethylene. A film of the copolymers of this invention may be used between the outer plastic layer and the inner fluffy absorbent layer. Use of the polymers of this invention can result in reduction in the bulk size of many disposable nonwovens.

The test for absorbency involves enclosing a weighed polymeric sample within a sewn strip of cheesecloth, the assembly resembling a tea bag. In order to determine the amount of fluid absorbed, a blank cheesecloth bag not containing polymer is treatment identically. Both the blank and polymer containing samples are immersed in the fluid, drained for a definite time and weighed. From the weights of the blank and sample after each immersion, the amount of fluid absorbed in a specific time is readily calculated. Powders, fibers, thin films and granules may be tested in this manner. Sample films are prepared by pressing the glycol/copolymer mixture in a Carver press between Teflon sheets. Cheesecloth bags were prepared from 15 cm sq. of cheesecloth folded over and sewn with thread. Samples were placed in the fluid to be absorbed for periods indicated in the data tables with 15 minutes drainage time between each immersion.

The polymers are readily prepared with lauroyl peroxide, t-butyl peroxy pivalate, azoisobutyronitrile and the like in a solvent for the monomer/nonsolvent for the copolymer.

The polymers used in the following examples were generally prepared following this procedure. Acrylic acid, methyl methacrylate and lauryl methacrylate in amounts of 78 weight percent acrylic acid, 15 weight percent methyl methacrylate and 7 weight percent lauryl methacrylate were polymerized in 675 weight parts of Freon 113 in the presence of 0.28 weight parts per 100 weight parts of monomers of caprylyl peroxide. The samples and materials were tested for water and ionic fluid absorbency and the results obtained are expressed as the absorbed fluid in a fluid/weight ratio.

EXAMPLE I

The polymer was neutralized with ammonium hydroxide to a pH of 6.25, was isolated from the reaction medium and dried in a vacuum oven. Portions of the polymer were then mixed with 20 weight parts of triethylene glycol per 100 weight parts of ammonium polymer salt and 55 weight parts of triethylene glycol per 100 weight parts of ammonium salt of the polymer. A dry, free-flowing polymer was obtained. Samples of the mixture were placed between Teflon sheets and placed in a press at 150° C. and 10,000 psi for 5 minutes. With 20 weight parts of triethylene glycol a film that was only barely bendable was obtained. With compositions containing 55 weight parts of triethylene glycol a very flexible clear film was formed. Films formed without any triethylene glycol were cloudy and brittle. The absorption data and water obtained is as follows:

| TEG Weight Parts | 20 | 55 | Absorbency for Simulated Urine 20 | 55 |
|---|---|---|---|---|
| Time Seconds | | Fluid/Weight of Film | | |
| 15 | 8.7 | 16.0 | 0.8 | 6.1 |
| 30 | 18.1 | 34.2 | 0.9 | 11.0 |
| 45 | 24.9 | 49.8 | 2.0 | 14.5 |
| 60 | 31.1 | 64.6 | 2.0 | 15.8 |
| 90 | 37.7 | 83.7 | 3.0 | 16.7 |
| 120 | 42.7 | 98.8 | 3.4 | 17.7 |
| 150 | 47.4 | 114.5 | 3.6 | 18.7 |
| 180 | 51.8 | 125.7 | 4.2 | 19.3 |

Not only is the film made with only 20 weight parts of triethylene glycol barely bendable but the water adsorption characteristics are greatly inferior to those of the flexible film containing 55 weight parts of triethylene glycol in both rate of absorption and total absorbency. An even more striking difference is observed when these materials are tested with simulated urine.

EXAMPLE II

Another polymer was prepared as described with 80 weight percent acrylic acid, 15 weight parts methyl methacrylate and 5 weight parts stearyl methacrylate. This polymer was 70% neutralized with potassium hydroxide to form the potassium salt to a pH of 7.0 and the polymer isolated and dried. 40 and 70 weight parts of propylene glycol were added to portions of the polymer salt with stirring and blended at low speeds for 5 minutes. Samples were pressed at 170° C. at 10,000 psi for one minute. The absorbency in simulated urine is set forth below.

| Time Seconds | 40 parts | 70 parts |
|---|---|---|
| 15 | 6.0 | 6.4 |
| 30 | 10.0 | 11.0 |
| 45 | 12.7 | 13.5 |
| 60 | 13.5 | 14.6 |
| 90 | 14.9 | 15.7 |
| 120 | 15.5 | 16.3 |

EXAMPLE III

A polymer was prepared as described containing 70 weight percent acrylic acid, 15 weight percent methyl methacrylate and 7 weight percent stearyl methacrylate. One portion of the polymer was neutralized with sodium hydroxide to a pH of 7.0, recovered and dried and mixed with 50 weight parts propylene glycol. Films pressed at 170° C. were not flexible and were brittle. Another portion of the polymer of the polymerization product was neutralized with lithium hydroxide to pH of 6.45 to form the lithium salt. After isolation and drying, the polymer was mixed with 50 weight parts of propylene glycol and pressed at 150° C. Neither of these films were flexible and were, in fact, brittle and of little utility.

Other polyhydroxy materials tried for the purpose of providing more flexible films with improved adsorbency characteristics including hydroxyl propyl cellulosics, cationic starches, phosphate-containing starches, polyvinyl pyrrolidone, sorbitol, high molecular weight polyethylene oxides, and the like have not provided the desired products used alone, nor have copolymers in the form of lithium and sodium salts.

EXAMPLE IV

A copolymer containing 7 weight parts of lauryl methacrylate, 10 weight parts methyl methacrylate and 83 weight parts of acrylic acid was neutralized with alcoholic KOH to form the potassium salt which was isolated and dried. After mixing with 50 weight parts of triethanolamine per 100 weight parts of the polymer of potassium salt, it was readily formed into film and tested for absorbency in simulated urine. The fluid/polymer ratio values obtained were: 15 seconds, 5.7; 30 seconds, 10.0; 45 seconds, 12.4; 60 seconds, 14.0; and 120 seconds, 17.2.

EXAMPLE V

The potassium salt of a copolymer of 5 weight parts stearyl methacrylate, 15 weight parts methyl methacrylate and 80 weight parts acrylic acid was mixed with 50 weight parts of poly(ethylene glycol) having a molecular weight of about 400 and tested for absorption in simulated urine. The fluid/polymer ratios obtained were 15 seconds, 5.5; 30 seconds, 11.6; 45 seconds, 16.1; and 60 seconds, 17.2.

EXAMPLE VI

The potassium salt of the copolymer of Example V was mixed with 40 weight parts propylene glycol and 5 weight parts trimethylol propane and the fluid/polymer ratios obtained in simulated urine were 15 seconds, 11.6 and 30 seconds, 20.0.

EXAMPLE VII

When the potassium salt of the copolymer of Example V was mixed with 25 weight parts of a polyethylene oxide having a molecular weight of 4,000,000, the fluid/polymer ratios in simulated urine were: 15 seconds, 4.9; 30 seconds, 8.6; 60 seconds, 10.8; and 120 seconds, 12.7.

EXAMPLE VIII

The potassium salt of the copolymer of Example V was mixed with 40 and 60 weight parts of

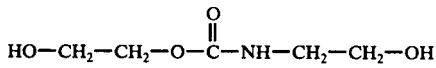

and tested for absorption capacity in distilled water with the following results:

| Time Seconds | 40 weight parts | 60 weight parts |
| --- | --- | --- |
| 15 | 12.8 | 28.2 |
| 30 | 36.7 | 55.3 |
| 45 | 57.2 | 78.2 |
| 60 | 73.9 | 92.9 |
| 90 | 90.0 | 107.6 |
| 120 | 102.0 | 118.8 |

These flexible water absorbent polymers in a form of films, fibers and the like, find many uses in disposable nonwoven absorbent paper products, disposable diapers, feminine hygiene products, medical-surgical supplies, industrial wipe cloths, and the like. They may be used as drape type dressings for burns. The materials also find uses as membranes generally, filters, as controlled release films, and in agricultural applications on seeds and soil, and the like.

I claim:

1. A composition of (A) an interpolymer of monomers comprising from about 40 to 87 weight percent of an olefinically unsaturated carboxylic acid monomer, 2 to 20 weight percent of (1) an acrylic ester monomer of the formula

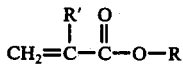

where R' is hydrogen, methyl or ethyl and R contains 10 to 30 carbon atoms and 5 to 30 weight percent of (2) at least one other acrylic or methacrylic nitrile, amide or ester, and (B) greater than about 30 weight parts per 100 of interpolymer of an aliphatic diol.

2. A composition of claim 1 wherein the interpolymer contains 0 to 3 weight percent of monomeric crosslinking agent.

3. A composition of claim 2 wherein in the interpolymer (1) is present is amount from about 5 to 15 weight percent and (2) is present in amount from about 5 to 25 weight percent.

4. A composition of claim 3 wherein said carboxylic acid monomer is acrylic acid, (1) is isodecyl methacrylate, lauryl methacrylate or stearyl methacrylate, and (2) is acrylonitrile, methacrylonitrile, acrylamide, methacrylamide or an alkyl acrylate or methacrylate wherein the alkyl group contains 1 to 9 carbon atoms.

5. A composition of claim 3 wherein said carboxylic acid monomer is acrylic acid, (1) is isodecyl methacrylate, lauryl methacrylate or stearyl methacrylate, in (2) the alkyl acrylate is ethyl acrylate or methyl methacrylate and (B) contains 3 to 10 carbon atoms and is present in amounts from 35 to 125 weight parts per 100 weight parts of (A).

6. A composition of claim 3 wherein the polymer contains about 0.01 to 0.5 weight percent cross-links.

7. A composition of claim 6 wherein at least about 30 weight percent of the COOH acid groups are neutralized to

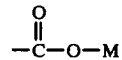

structure wherein M is selected from the group consisting of K and NH₄ ions and quaternary nitrogen compounds, R₃NH.

8. A composition of claim 7 wherein the glycol is triethylene glycol or propylene glycol.

9. A composition of claim 3 wherein the acid is acrylic acid, methacrylic acid, maleic acid or the anhydrides thereof.

10. A composition of claim 9 wherein the crosslinking monomer contains at least a CH₂=C< grouping and at lease one other polymerizable grouping, said polymerizable groupings being unsaturated nonconjugated bonds.

11. A composition of claim 10 wherein said crosslinking monomer is a polyalkenyl polyether of a polyhydric alcohol containing more than one alkenyl ether group per molecule and the parent polyhydric alcohol contains at least 3 hydroxyl groups in amounts of 0.01 to less than 0.5 weight percent of the total monomers.

12. A composition of claim 11 wherein said monomer is allyl pentaerythritol.

13. A composition of claim 11 wherein said monomer is allyl sucrose.

14. A composition of claim 8 wherein there is 7 to 13 weight percent of (1) lauryl methacrylate and (2) is methyl methacrylate.

15. A composition of claim 8 wherein there is 7 to 13 weight percent of (1) lauryl methacrylate and (2) is acrylamide.

16. A composition of claim 8 wherein there is 7 to 13 weight percent of (1) lauryl methacrylate and (2) is acrylonitrile.

17. A composition of claim 8 wherein there is 7 to 13 weight percent of (1) stearyl methacrylate and (2) is acrylamide.

18. A composition of claim 8 wherein there is 7 to 13 weight percent of (1) stearyl methacrylate and (2) is acrylonitrile.

19. A composition of claim 8 wherein there is 7 to 13 weight percent of (1) stearyl methacrylate and (2) is methyl methacrylate.

20. A composition of claim 3 wherein said carboxylic acid monomer is acrylic acid, (1) is isodecyl methacrylate, lauryl methacrylate or stearyl methacrylate, in (2) the alkyl acrylate is ethyl acrylate or methyl methacrylate and (B) is a glycol ether having a molecular weight of greater than about 400.

* * * * *

UNITED STATES PATENT AND TRADEMARK OFFICE
CERTIFICATE OF CORRECTION

PATENT NO. : 4,066,583
DATED : January 3, 1978
INVENTOR(S) : David C. Spaulding

It is certified that error appears in the above-identified patent and that said Letters Patent are hereby corrected as shown below:

Column 10, line 49 delete "adsorb-" and insert therefore --- absorb- ---.

Column 12, line 7 delete "is" (second occurance) and insert --- in ---.

Signed and Sealed this

Fourteenth Day of August 1979

[SEAL]

Attest:

*Attesting Officer*

LUTRELLE F. PARKER
*Acting Commissioner of Patents and Trademarks*